United States Patent [19]

Szegda

[11] Patent Number: 5,283,853

[45] Date of Patent: Feb. 1, 1994

[54] FIBER OPTIC END CONNECTOR

[75] Inventor: Andrew Szegda, Canastota, N.Y.

[73] Assignee: John Mezzalingua Assoc. Inc., Manlius, N.Y.

[21] Appl. No.: 836,079

[22] Filed: Feb. 14, 1992

[51] Int. Cl.⁵ .................................................. G02B 6/26
[52] U.S. Cl. .................................. 385/139; 385/136; 385/138
[58] Field of Search .......................... 385/139, 136, 138

[56] References Cited

U.S. PATENT DOCUMENTS

| | | | |
|---|---|---|---|
| 1,186,813 | 6/1916 | McFerran | 285/341 |
| 2,470,538 | 5/1949 | Wolfram et al. | 285/86 |
| 2,678,963 | 5/1954 | Everhart | 174/48 |
| 3,243,207 | 3/1966 | Carpenter et al. | 285/248 |
| 3,748,551 | 7/1973 | Petersen | 317/246 |
| 3,825,320 | 7/1974 | Redfern | 385/138 |
| 3,843,832 | 10/1974 | Petersen et al. | 174/151 |
| 3,846,010 | 11/1974 | Love et al. | 350/96 |
| 3,856,983 | 12/1974 | Fisher et al. | 174/151 |
| 3,883,681 | 5/1975 | Campbell | 174/65 |
| 3,999,837 | 12/1976 | Bowen et al. | 350/96 |
| 4,008,948 | 2/1977 | Dalgleish et al. | 350/96 |
| 4,168,921 | 9/1979 | Blanchard | 403/19 |
| 4,217,031 | 8/1980 | Mignien et al. | 350/96.21 |
| 4,236,787 | 12/1980 | Iacono et al. | 350/96.21 |
| 4,253,730 | 3/1981 | Logan et al. | 350/95.21 |
| 4,291,941 | 9/1981 | Melzer | 350/96.18 |
| 4,296,996 | 10/1981 | Niiro et al. | 385/138 |
| 4,346,958 | 8/1982 | Blanchard | 339/177 R |
| 4,406,515 | 9/1983 | Roberts | 350/96.21 |
| 4,444,461 | 4/1984 | Wey et al. | 350/96.21 |
| 4,458,983 | 7/1984 | Roberts | 350/96.20 |
| 4,461,538 | 7/1984 | Breed et al. | 350/96.20 |
| 4,461,539 | 7/1984 | Bailey et al. | 350/96.21 |
| 4,486,072 | 12/1984 | Roberts | 350/96.21 |
| 4,548,465 | 10/1985 | White | 385/138 |
| 4,573,760 | 3/1986 | Fan | 350/96.21 |
| 4,589,688 | 5/1986 | Johnson | 285/12 |
| 4,679,895 | 7/1987 | Huber | 350/96.20 |
| 4,759,601 | 7/1988 | Knutsen | 350/96.21 |
| 4,786,134 | 11/1988 | Fort et al. | 385/139 X |
| 4,842,364 | 6/1989 | Chen | 385/136 |
| 4,891,640 | 1/1990 | Ip | 385/138 X |

FOREIGN PATENT DOCUMENTS 2058987 4/1981 United Kingdom .
2140577 11/1984 United Kingdom .

Primary Examiner—Rodney B. Bovernick
Assistant Examiner—Stephen W. Barns
Attorney, Agent, or Firm—Samuels, Gauthier & Stevens

[57] ABSTRACT

An end connector for connecting a tubular support structure having at least one optic fiber associated with a fiber optic cable, to a terminal of an associated device. A housing member is configured with a passageway from a front end to a rear end for passing the tubular support structure therethrough. A clamping portion including a flexible sleeve and compression grommet are received and supported by both the housing and a compression nut which couples to the rear end of the housing. As the compression nut is threaded onto the rear end of the housing, the compression grommet is compressed, and in turn the flexible sleeve constricts to apply clamping pressure to the tubular support structure holding the optic fibers.

16 Claims, 2 Drawing Sheets

FIBER OPTIC END CONNECTOR

BACKGROUND OF THE INVENTION

This invention relates to end connectors used to connect optic fibers of a fiber optic cable to device ports, terminals or the like.

Fiber optic technology is being increasingly adapted for various applications in industries such as cable television for replacing coaxial cables. Such adaptations involve varying hybrid fiber optic systems, wherein fiber optic transport cables are linked to down-line optical repeaters or amplifiers, and to junctions where a conversion to light wave frequencies from radio frequencies for distribution to associated equipment takes place. The use of fiber optics in an industry such as cable television allows for the increases in both the reliability and number of channels of the system. The technology also allows for the expansion of basic television service to include services such as HDTV (High Definition Television), and PCN (Personal Communication Networks) so that the cable television system may compete with the telephone industry.

The cables being utilized in such systems are configured to protect and transport optic fibers, varying from a single fiber to hundreds of fibers. The cables are manufactured in a number of configurations, and most include various structural strength and support members with an outer protective dielectric plastic jacket. A variety of support members are available including corrugated metallic sheaths, plastic or glass fillers, peripherals strength members steel wires, glass filament rods or Kevlar TM placed in either peripheral positions or as a center support rod, or steel center support wires. Such support members are critical components given the hostile environments in which the cables are employed, i.e., placement in tunnels, fed through conduits, buried underground, or pulled-2-pole connections.

The individual optic fibers, as well as groups of fibers, are carried in small hard protective tubular support structures or "tubes" within the cable. The optic fibers are delicate and cannot be subjected to damage or stresses from bending, stretching, moisture or chemical intrusion, excessive rotational or longitudinal stresses on the cable or any other circumstance that could effect the optical transmission characteristic of the individual optic fibers. Furthermore, damage to the optic fibers may result from excessive rotational and radial stresses involved in linking either the entire cable or the individual tubes to the intended device equipment.

It is therefore an object of the present invention to provide a fiber optic end connector which supports the tubular support structures which contain one or more optic fibers in a secured position so as to resist rotational and longitudinal forces while being coupled to equipment terminals.

SUMMARY OF THE INVENTION

An end connector in accordance with the present invention is utilized for connecting a tubular support structure, which encloses at least one optic fiber, associated with a fiber optic cable to a terminal of an associated device. The end connector has a housing member with a through passageway extending from a front end to a rear end thereof. Coupling means are provided for coupling the housing member to the terminal of the associated device. A clamp means is provided which is at least partially received within the passageway and is adapted to at least partially surround the tubular support structure. The clamp means is adjustable between an expanded state which accommodates movement of the tubular support structure with respect to the housing in a constricted state which fixedly secures the tubular support structure with respect to the housing. Clamp adjustment means are provided for adjusting the clamp means between the expanded and the constricted state.

DESCRIPTION OF THE ILLUSTRATED EMBODIMENTS

With reference to FIGS. 1-4 an end connector in accordance with the present invention is generally indicated at 100.

In the example herein selected for illustrative purposes, a tubular support structure 2 associated with a fiber optic cable (not shown) is illustrated as including a plurality of optic fibers 4.

Figure 1:
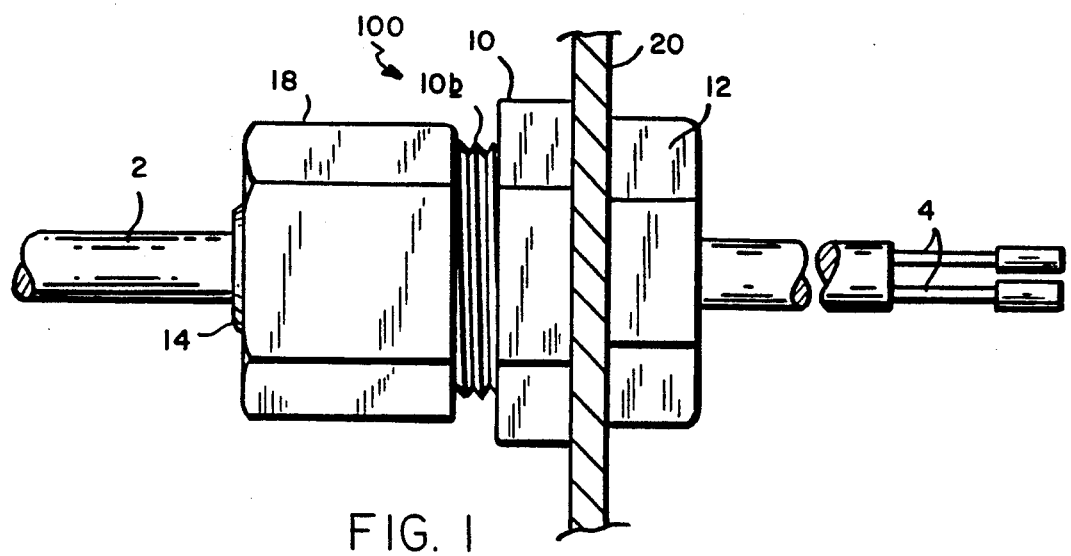
FIG. 1 is a longitudinal side view showing an end connector in accordance with the present invention in an assembled state and coupling a tubular support structure with optic fibers to an associated device terminal.
Figure 2:
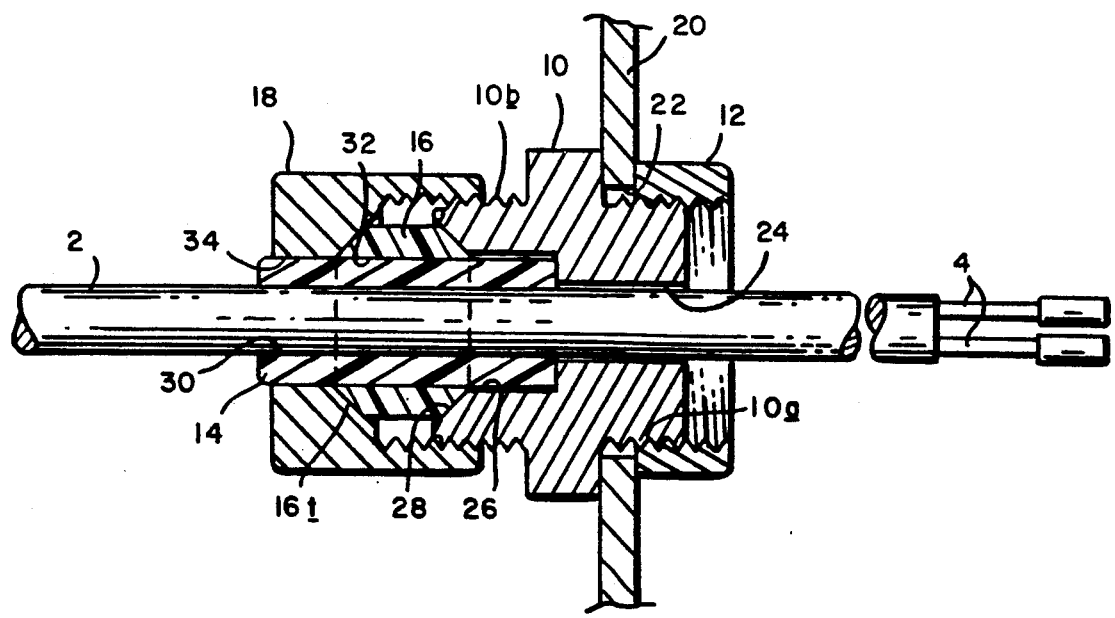
FIG. 2 is a longitudinal sectional view of the end connector in accordance with the present invention in the assembled state.
Figure 3:
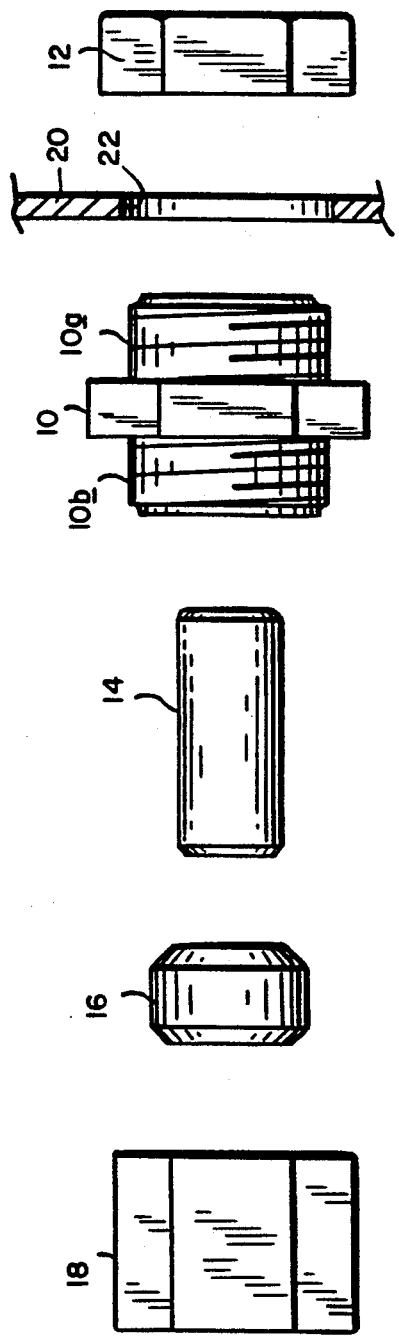
FIG. 3 is a side view of the end connector in accordance with the present invention in a disassembled state.

As shown in FIGS. 1 and 2, the end connector 100 enables the tubular support structure 2 to be coupled to a down-line device 20 at a terminal 22. The end connector includes a housing 10 having an externally threaded coupling extension 10a at the front end thereof, and an externally threaded coupling extension 10b at the rear end thereof. The coupling extension 10a is arranged to be releasably coupled to the terminal 22 by threaded engagement. An internal mounting nut 12 may be provided to secure the housing to the port 22.

Figure 4:
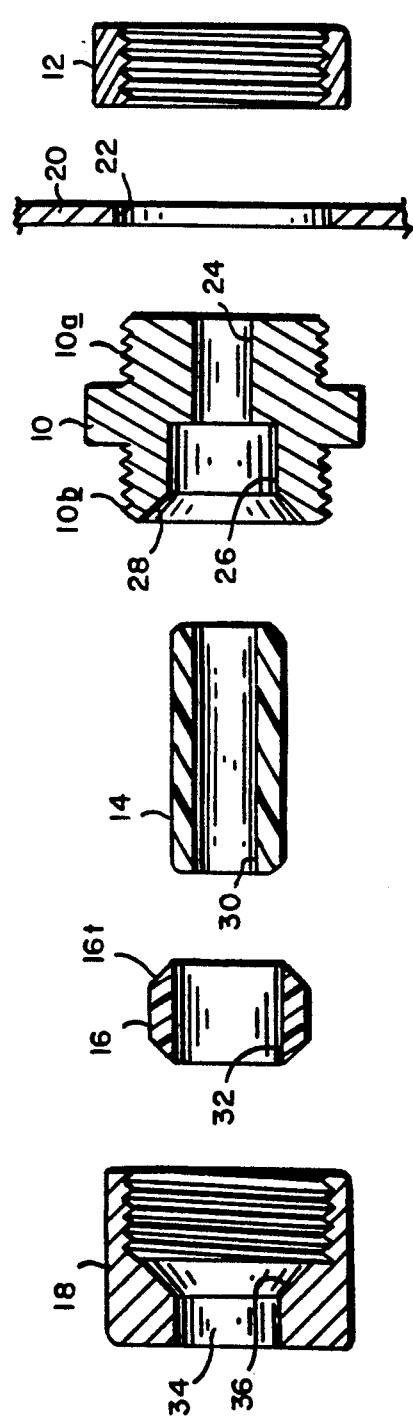
FIG. 4 is a longitudinal sectional view of the end connector in accordance with the present invention in the disassembled state.

As best shown in FIG. 4, a through passageway 24 extends from front to rear through the housing 10. The passageway 24 accommodates a passage of the tubular support structure 2 through the housing 10 and into the device 20.

The end connector in accordance with the present invention includes a clamping portion which comprises a flexible sleeve 14 and a compression grommet 16. The flexible sleeve 14 is configured with a passageway 30 for passing the tubular support structure therethrough. The compression grommet 16 is configured with a passageway 32 for receiving the flexible sleeve 14 therein. Both the flexible sleeve and compression grommet are partially received in recessed portions 26, 28 of the passageway 24 of the housing 10.

A compression nut 18 having a through passageway 34 for the tubular support structure 2 is configured to be releasably coupled to the rear end portion 10b of the housing 10 by threaded engagement. The passageway 34 partially receives and supports the flexible sleeve 14, and includes a recessed portion 36 which partially receives and supports the compression grommet 16 during engagement with the housing 10.

The end connector 100 is best shown in an assembled state in FIG. 2. As illustrated, the flexible sleeve 14 is assembled over the tubular support structure 2 and is received within the recessed portion 26 of the passageway 24 in the housing 10. The compression grommet 16 is assembled to surround the flexible sleeve 14 and is received and supported by both the recessed portion 28 of the housing 10 and the recessed portion 36 of the compression nut 18. As the compression nut 18 is threaded onto the rear end portion 10b of the housing 10, the compression grommet 16 is compressed, and in turn, applies pressure on the flexible sleeve 14 which applies clamping pressure to the tubular support structure 2 containing the optic fibers 4.

The surfaces associated with the recessed portion 36 and the recessed portion 28 compress against tapered surfaces 16t of the compression grommet 16, forcing an inward movement of the pliable material of the compression grommet. This compression action applies pressure to the flexible sleeve, which in turn constricts inwardly to grip the tubular support structure 2. The compression grommet and the flexible sleeve apply compressive forces to the tubular support structures and supply traction forces which prevent the tubular support structures from being pulled out from the housing 10 by externally applied longitudinal forces. The clamping pressure is further applied without pinching the tubes which may damage the optic fibers.

The end connector may be modified to allow for variations in tube sizes by providing slits in both or either of the flexible sleeve 14 and the compression grommet 16, along the longitudinal axis of each piece.

While many of the components describe herein with respect to the end connector 100 according to the present invention have been shown to be releasably coupled to one another by threaded engagement, it will appreciated by those skilled in the art that the components may be engaged to one another by any conventional coupling technique. For instance, pressure or snap fittings may be utilized in order to releasably couple the components to one another.

Having shown illustrated embodiments, those skilled in the art will realize many variations are possible which will still be within the scope and spirit of the claimed invention. Therefore, it is the intention to limit the invention only as indicated by the scope of the claims.

What is claimed is:

1. A connector for connecting a tubular support structure associated with a fiber optic cable to a terminal of a signal processing device, said tubular support structure enclosing at least one optic fiber, said connector comprising:
    a housing member having a front end and a rear end, said housing member defining a first passageway extending from said rear end to said front end for axially passing said tubular support structure therethrough;
    coupling means threadedly engageable with the front end of said housing for coupling said housing member to said terminal;
    flexible clamp means at least partially received within said first passageway at said front end and adapted to at least partially surround said tubular support structure;
    clamp adjustment means threadedly engageable with said rear end; and
    compression means responsive to threaded engagement of said clamp adjustment means with the rear end of said housing for radially inwardly urging said clamp means from an expanded state accommodating axial passage of said tubular support structure through said housing into a constricted state fixedly securing said tubular support structure with respect to said housing.

2. The connector as claimed in claim 1, wherein said clamp adjustment means defines a second passageway for passing said tubular support structure therethrough, said clamp means at least partially received within said second passageway.

3. The connector as claimed in claim 2, wherein said clamp adjustment means is arranged to contact said clamp means in order to adjust said clamp means between said expanded and constricted states.

4. The connector as claimed in claim 1, wherein said clamp means comprises a flexible sleeve at least partially surrounding said tubular support structure and adapted to constrict inwardly about said tubular support structure in order to provide increasing clamping pressure on said tubular support structure as said clamp means is adjusted to said constricted state.

5. The connector as claimed in claim 4, wherein said compression means comprises a grommet at least partially surrounding said flexible sleeve and adapted to compress inwardly about said flexible sleeve which in turn provides increasing clamping pressure on said tubular support structure as said clamp means is adjusted to said constricted state.

6. The connector as claimed in claim 5, wherein said clamp adjustment means defines a second passageway for passing said tubular support structure therethrough, said clamp means at least partially received within said second passageway.

7. The connector as claimed in claim 6, wherein said clamp adjustment means is arranged to contact said clamp means in order to adjust said clamp means between said expanded and constricted states.

8. The connector as claimed in claim 7, wherein said first passageway defines a first recess which receives front end portions of said flexible sleeve and said grommet, said second passageway defining a second passageway which receives rear end portions of said flexible sleeve and said grommet.

9. The connector as claimed in claim 8, wherein said first and second recesses include compression surfaces which contact said grommet so as to compress said grommet as said clamp adjustment means is coupled to said rear end of said housing.

10. An end connector for connecting a tubular support structure associated with a fiber optic cable to a terminal of a signal processing device, said tubular support structure enclosing at least one optic fiber, said end connector comprising:
    a housing member having a front end and a rear end, said housing member defining a first passageway extending from said rear end to said front end for passing said tubular support structure therethrough, said front end adapted to be coupled to said terminal;
    a first clamp member adapted to at least partially surround said tubular support structure, said first clamp member being adjustable between an expanded state which accommodates movement of said tubular support structure with respect to said housing and a constricted state which fixedly secures said tubular support structure with respect to said housing;

a second clamp member adapted to at least partially surround said first clamp member, said second clamp member operable for adjusting said first clamp member between said expanded and constricted states; and a clamp adjustment member releasably coupled to said rear end of said housing member and arranged to coact with said second clamp member in order to adjust said first clamp means between said expanded and constricted states.

11. The end connector as claimed in claim 10, wherein said first clamp member comprises a flexible sleeve at least partially surrounding said tubular support structure, and is adapted to constrict inwardly about said tubular support structure in order to provide increasing clamping pressure on said tubular support structure as it is adjusted to said constricted state.

12. The end connector as claimed in claim 11, wherein said second clamp member comprises a grommet which is adapted to compress inwardly about said flexible sleeve which in turn provides increasing clamping pressure on said tubular support structure as said clamp adjustment member is coupled to said housing member.

13. The end connector as claimed in claim 12, wherein said clamp adjustment member defines a second passageway for passing said tubular support structure therethrough, said first and second clamp members at least partially received within said second passageway.

14. The end connector as claimed in claim 13, wherein said first passageway defines a first recess which receives front end portions of said flexible sleeve and said grommet, said second passageway defining a second passageway which receives rear end portions of said flexible sleeve and said grommet.

15. The end connector as claimed in claim 14, wherein said first and second recesses include compression surfaces which contact said grommet so as to compress said grommet as said clamp adjustment member is coupled to said rear end of said housing.

16. The end connector as claimed in claim 15, wherein said clamp adjustment member is coupled to said rear end of said housing by threaded engagement.

* * * * *